(12) United States Patent
Crum

(10) Patent No.: US 8,066,271 B2
(45) Date of Patent: Nov. 29, 2011

(54) FORM HAVING ABUTTING TAPE-INTERCONNECTED SUBSTRATES AND METHOD OF MAKING SAME

(75) Inventor: Jesse D. Crum, Fort Scott, KS (US)

(73) Assignee: Ward-Kraft, Inc., Fort Scott, KS (US)

( * ) Notice: Subject to any disclaimer, the term of this patent is extended or adjusted under 35 U.S.C. 154(b) by 144 days.

(21) Appl. No.: 12/533,798

(22) Filed: Jul. 31, 2009

(65) Prior Publication Data

US 2009/0289447 A1  Nov. 26, 2009

Related U.S. Application Data

(60) Division of application No. 11/770,663, filed on Jun. 28, 2007, now Pat. No. 7,618,034, which is a continuation of application No. 11/379,122, filed on Apr. 18, 2006, now abandoned, which is a continuation of application No. 10/248,570, filed on Jan. 29, 2003, now Pat. No. 7,029,001, which is a continuation-in-part of application No. 10/065,735, filed on Nov. 13, 2002, now Pat. No. 6,773,181.

(51) Int. Cl.
*B65H 37/00* (2006.01)

(52) U.S. Cl. .................................................. 270/52.18

(58) Field of Classification Search .............. 270/5.01, 270/5.02, 5.03, 52.07, 52.08, 52.09, 52.1, 270/52.11, 52.12; 226/15, 18, 20, 21, 22, 226/23, 196.1
See application file for complete search history.

(56) References Cited

U.S. PATENT DOCUMENTS

| | | | | |
|---|---|---|---|---|
| 2,213,157 A | * | 8/1940 | Brenn | 270/52.1 |
| 3,598,332 A | * | 8/1971 | Sharkey | 242/578 |
| 4,865,669 A | * | 9/1989 | Schmidt | 156/91 |
| 5,304,418 A | * | 4/1994 | Akada et al. | 428/345 |
| 5,749,567 A | * | 5/1998 | DeAngelis | 270/7 |
| 5,756,175 A | * | 5/1998 | Washburn | 428/42.3 |

* cited by examiner

*Primary Examiner* — Leslie A Nicholson, III
(74) *Attorney, Agent, or Firm* — Hovey Williams LLP

(57) ABSTRACT

A business form product (10) broadly including a printable sheet (12), a magnetic sheet (14) aligned edge-to-edge with the printable sheet (12) to define a seam (16), and a heat-resistant tape (18) applied over the seam (16) to retain the sheets (12,14) in the edge-to-edge relationship is disclosed. The inventive business form product (10, 106) is formed by joining multiple continuous webs (38, 58) edge-to-edge and marrying the webs (38,58) with a continuous streamer of tape (86) in a press (36). A preferred embodiment of the inventive method of forming the continuous sheet (106) is disclosed wherein at least one rotatable mechanical web guide (72) is used to align the webs (38,58) in the edge-to-edge relationship, thereby enabling precise alignment not available with existing optic-type web guides. A preferred embodiment of the printable business form product (10) is disclosed wherein heat-resistant tape (18) enables the business form product (10) to be printed in high-heat printing applications (e.g., printed in an offline laser printer) without fracturing the taped seam (16).

46 Claims, 5 Drawing Sheets

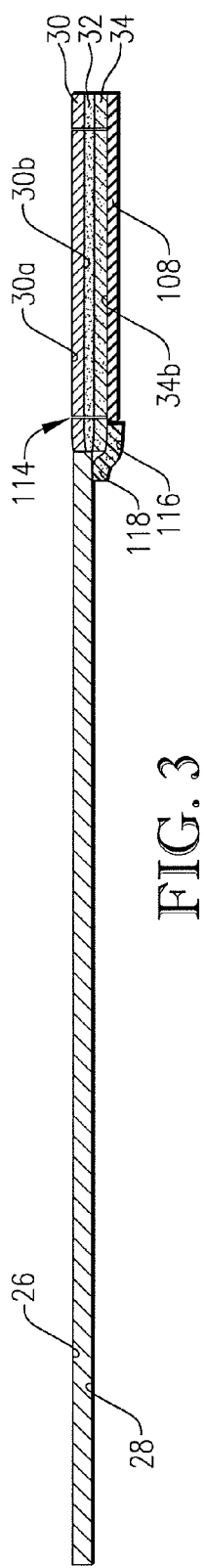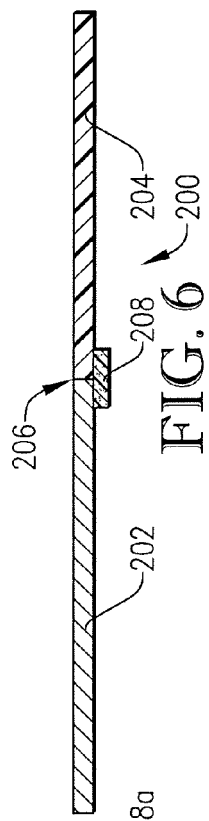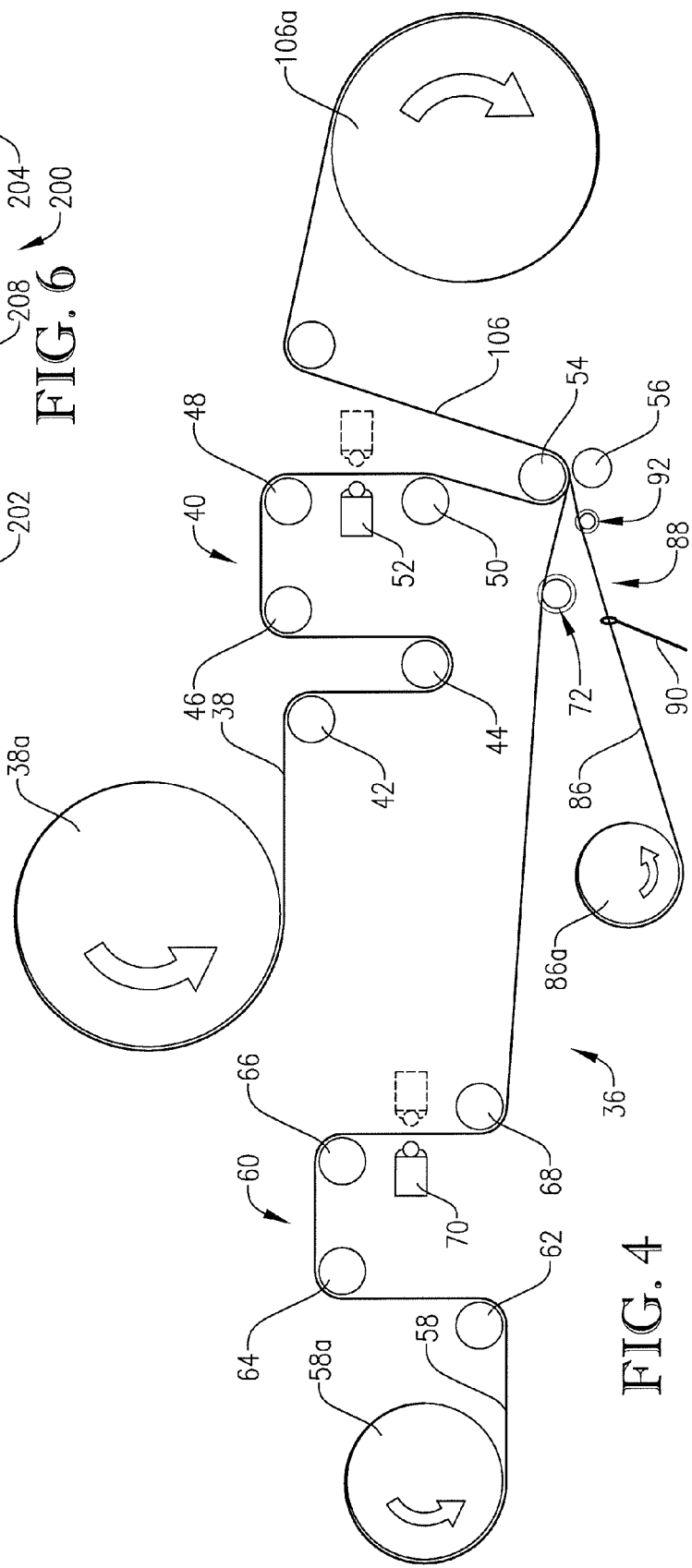

FORM HAVING ABUTTING TAPE-INTERCONNECTED SUBSTRATES AND METHOD OF MAKING SAME

RELATED APPLICATIONS

The present application is a divisional application of application for U.S. Letters patent Ser. No. 11/770,663 entitled FORM HAVING ABUTTING TAPE-INTERCONNECTED SUBSTRATES AND METHOD OF MAKING SAME, filed Jun. 28, 2007, which is a continuation application of application for U.S. Letters patent Ser. No. 11/379,122 entitled FORM HAVING ABUTTING TAPE-INTERCONNECTED SUBSTRATES AND METHOD OF MAKING SAME, filed Apr. 18, 2006, which is a continuation application of application for U.S. Letters patent Ser. No. 10/248,570 entitled FORM HAVING ABUTTING TAPE-INTERCONNECTED SUBSTRATES AND METHOD OF MAKING SAME, filed Jan. 29, 2003, now U.S. Pat. No. 7,029,001, which is a continuation-in-part application of application for U.S. Letters patent Ser. No. 10/065,735 entitled DIE CUT SHEET WITH APPLIED COATING CARRIER, filed Nov. 13, 2002, now U.S. Pat. No. 6,773,181 ("the '735 application"), all of which are hereby incorporated by reference herein.

BACKGROUND OF THE INVENTION

1. Field of the Invention

The present invention relates generally to printable forms formed in a rotary press. More specifically, the present invention concerns a continuous printable sheet, and individual printable forms sheeted therefrom, wherein the continuous printable sheet is formed by joining multiple continuous webs edge-to-edge and marrying the webs with a heat-resistant tape. A preferred embodiment of the inventive method of forming the continuous sheet includes utilizing at least one rotatable mechanical web guide to align the webs, thereby enabling precise alignment not available with existing optic-type web guides. A preferred embodiment of the printable form includes a heat-resistant tape that enables the form to be printed in high-heat printing applications (e.g., printed in an offline laser printer) without fracturing the taped seam.

2. Discussion of Prior Art

It is desirable in many printing applications to join multiple continuous webs in a press to form a single continuous printable sheet that can be printed, sheeted into forms before or after printing, etc. It is desirable to enable joining differing webs, for example, webs formed of different materials (e.g., paper, magnetic material, etc.) and/or having differing thicknesses (e.g., one web having a single layer and one web having multiple layers, etc.). However, the continuous printable sheet, and any individual form, or blank, formed therefrom, is preferably adapted to be subsequently fed through any desired printing system (e.g., a downstream inline print station in a press, an offline laser printer, etc.). Accordingly, the multiple webs must be sufficiently adhered together, or married, to enable the resulting sheet to withstand a subsequent printing operation. Adhesion applications have proven difficult and ineffective when using certain types of substrates, and have prevented the utilization of certain types of printing systems. For example, when a relatively thick substrate is used in one of the webs (e.g., a magnetic substrate, a plastic substrate, etc.) for joinder with a relatively thin web (e.g., paper, etc.), the thicker web must typically be overlain with the thinner web to provide the necessary strength of the seam. The thickness of the adhesion seam is undesirable if the resulting blank cannot be fed into a desktop printer, such as a laser or ink jet printer.

It is known in the art to overlay the edges of continuous webs and adhere the webs together with a glue-type adhesive to form a single continuous sheet. It is known in the art to utilize optic-type web guides to align the webs prior to joinder. One example of the prior art web guides are available as special orders (e.g., configured for the specific thickness and the width of the web as provided by the customer) from Coast Controls Inc. of Sarasota, Fla. It is also known in the art to utilize tape to retain die cut, removable sections in a continuous sheet or a blank, such as a card. These prior art joinder methods and prior art taping techniques are problematic and subject to several undesirable limitations.

For example, the prior art joinder methods produce a thick seam including both substrates and the adhesive, wherein the adhesive may comprise multiple layers. When one of the substrates is relatively thick (e.g., a magnetic or plastic substrate), the thick seams do not enable the forms to be fed into a laser printer. Moreover, the thickness of the seam hinders or even prevents the forms from being stacked up, as is desirable for offline printing applications. The prior art optic-type web guides used to align the substrates prior to joinder do not enable the desired tolerances for edge-to-edge marrying. For example, prior art web guides typically include a sensor that effects aligning movement of an upstream roller. However, there is a necessary delay in sensing a web is out of alignment and the corrective realignment of the upstream roller. This delay results in a see-saw type movement of the web, or a "loop." Accordingly, prior art web guides are limited to alignment tolerances of about one-thirty-seconds inch or at best one-sixty-fourths inch. It is also known in the art to run the web over a stationary obstruction (e.g., a piece of metal, etc.) in the web's path to effect alignment. However, this method of alignment causes large amounts of friction between the web and the obstruction, which results in heat, which in turn leads to undesired damage of the web.

The prior art taping techniques do not enable the form or blank to be printed in some desirable printing systems. For example, it is becoming increasingly more popular for end users to print forms or blanks in their own desktop laser printers. However, these laser printers are relatively high-heat printing stations that subject the forms to temperatures as high as 175 degrees Fahrenheit. The prior art taping techniques utilized tape that could not withstand the temperatures of the high-heat printing stations, i.e., the tape would lose its integrity and the seam would fracture.

SUMMARY OF THE INVENTION

The present invention provides a continuous printable sheet, and individual printable forms sheeted therefrom, and a method of making the same that do not suffer from the problems and limitations of the prior art joinder methods and taping techniques detailed above. The inventive continuous printable sheet is formed by joining multiple continuous webs edge-to-edge and marrying the webs with a streamer of tape. A preferred embodiment of the inventive method of forming the continuous sheet includes utilizing at least one rotatable mechanical web guide to align the webs, thereby enabling precise alignment not available with existing optic-type web guides. A preferred embodiment of the printable form includes a heat-resistant tape that enables the form to be printed in high-heat printing applications (e.g., printed in an offline laser printer) without fracturing the taped seam.

A first aspect of the present invention concerns a method of forming a business form product of multiple substrates. The method includes the steps of feeding a first continuous substrate web along a longitudinal path, feeding a second continuous substrate web along the path, aligning the first and second webs in an edge-to-edge relationship to form a seam therebetween, wherein the seam extends along and is at least generally parallel to the path, and applying a continuous streamer of tape to the webs over and along the seam to retain the webs in said edge-to-edge relationship to thereby form a common continuous sheet.

A second aspect of the present invention concerns a printable business form product that comprises multiple substrates. The business form product is formed by a process including the steps of feeding a first continuous substrate web along a longitudinal path, feeding a second continuous substrate web along the path, aligning the first and second webs in an edge-to-edge relationship to form a seam therebetween, wherein the seam extends along and is at least generally parallel to the path, and applying a continuous streamer of tape to the webs over and along the seam to retain the webs in said edge-to-edge relationship to thereby form a common continuous sheet.

A third aspect of the present invention concerns a rotary press for joining multiple continuous webs into a single continuous sheet. The press broadly includes a first unwinding station for feeding a first one of the multiple continuous webs downstream, a second unwinding station for feeding a second one of the multiple continuous webs downstream, and a mechanical web guide including a shaft and at least one collar associated with the shaft. The first unwinding station includes at least one first idler roller and means for aligning the first web relative to the first idler roller. The second unwinding station includes at least one second idler roller and means for aligning the second web relative to the second idler roller. The collar is operable to align the second web relative to the first web. At least a portion of the mechanical web guide is operable to engagingly receive the second web and is rotatable when the second web is engagingly received thereon.

A fourth aspect of the present invention concerns a printable blank broadly including a first portion formed from a first web, a second portion formed from a second web, and tape retaining the first and second portions together. The first portion is positioned in an edge-to-edge relationship with the second portion to define a seam therebetween. The tape retains the first and second portions in the edge-to-edge relationship and is affixed to the first and second portions overlying the seam. The tape is heat resistant.

Other aspects and advantages of the present invention will be apparent from the following detailed description of the preferred embodiments and the accompanying drawing figures.

BRIEF DESCRIPTION OF THE DRAWING FIGURES

Preferred embodiments of the invention are described in detail below with reference to the attached drawing figures, wherein:

FIG. 3 is a sectional view of the business form product taken substantially along line 3-3 of FIG. 1 showing the seam between the multiple layers of the lower section and the upper section;

FIG. 4 is a schematic diagram of a rotary press for forming a business form product of a preferred embodiment of the present invention and including a mechanical web guide for aligning one of the webs edge-to-edge with the other web and a pair of mechanical tape guides for aligning the tape over the seam between the webs;

FIG. 6 is a sectional view of a business form product constructed in accordance with a preferred alternative embodiment of the present invention and including multiple substrates joined edge-to-edge with a streamer of heat-resistant tape over the seam.

DETAILED DESCRIPTION OF THE PREFERRED EMBODIMENTS

Figure 1:
FIG. 1 is a front elevational view of a business form product constructed in accordance with a preferred embodiment of the present invention and including a bisectional, continuous printed surface formed from an upper paper section joined edge-to-edge with a lower magnetic section and adhered at the seam with a heat-resistant tape.

FIG. 1 illustrates a business form product 10 constructed in accordance with the principles of a preferred embodiment of the present invention. As detailed below, the illustrated business form product 10 is formed by joining two continuous webs edge-to-edge and joining the webs with a streamer of heat-resistant tape to form a continuous roll. However, it is within the ambit of the present invention to marry more than two webs into a single continuous sheet with the principles of the present invention. The illustrated business form product 10 is a form that has been sheeted from the continuous roll and printed in an offline laser printer. However, the principles of the present invention are not limited to sheeted, printed forms and equally apply to other business form products, which as will be defined below, includes the continuous roll, before or after printing. It is important, however, that the business form product 10 is formed by the inventive method as subsequently described in detail. The illustrated business form product 10 broadly includes a printable sheet 12, a magnetic sheet 14 aligned edge-to-edge with the printable sheet 12 to define a seam 16, and a heat-resistant tape 18 applied over the seam 16 to retain the sheets 12,14 in the edge-to-edge relationship.

The illustrated business form product 10 is a bisectional, generally rectangular form presenting an upper section 20 and a lower section 22. As will be subsequently described in detail, the sections 20,22 are joined to present a continuous printable surface 24. That is to say, the form 10 can be fed into a single printing system to print the entire surface 24 in one application. The upper section 20 comprises the printable sheet 12 and the lower section 22 comprises the magnetic sheet 14, a coating carrier and a plurality of die cuts as will be described.

Figure 2:
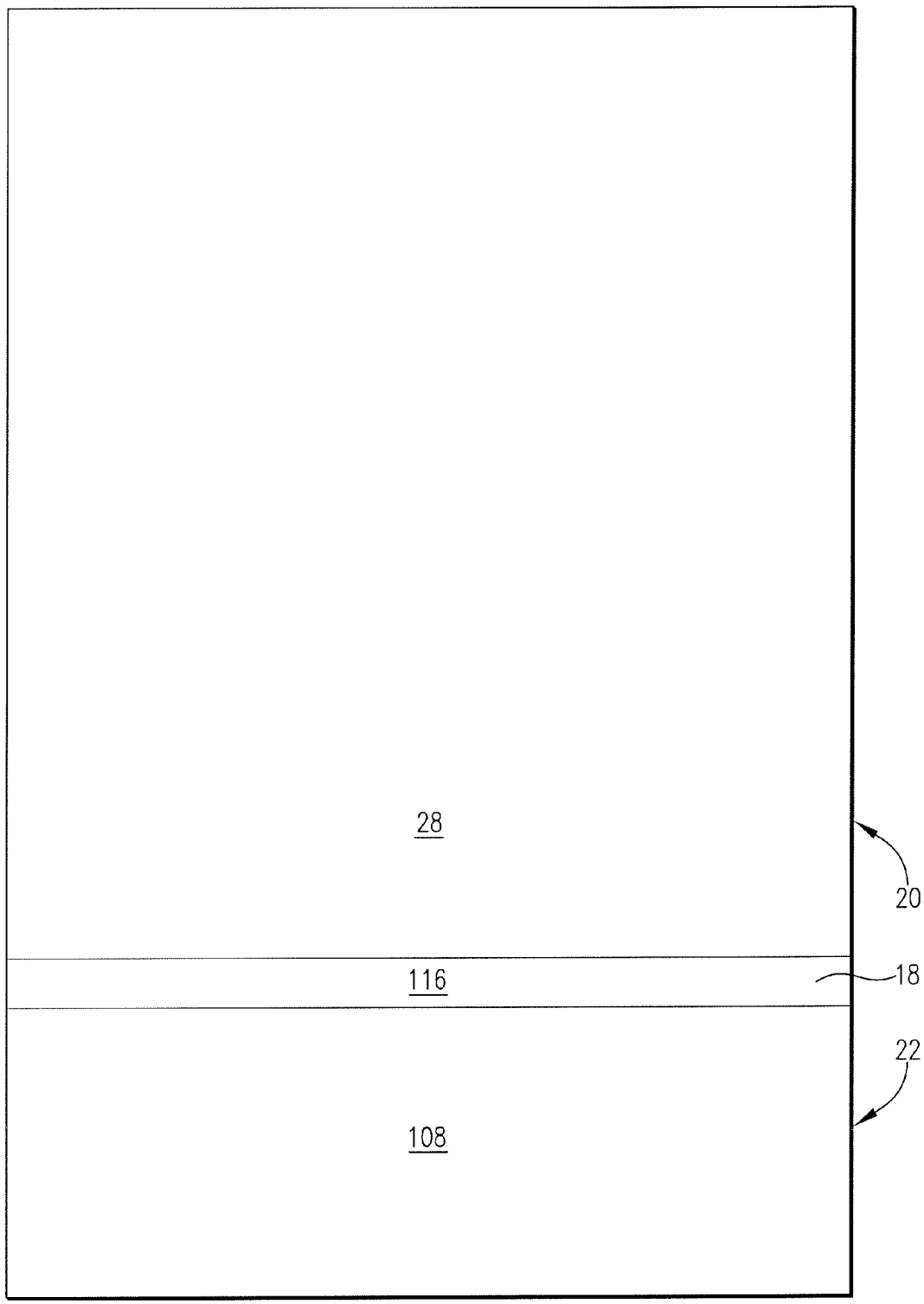
FIG. 2 is a rear elevational view of the business form product illustrated in FIG. 1 showing the heat-resistant tape over the seam between the upper and lower sections.

As shown in FIGS. 1-3, the illustrated printable sheet 12 includes a top printable surface 26 and a bottom surface 28 opposite the surface 26. The printable surface 26 comprises the upper portion of the printable surface 24. In the sheet 12, the printable surface 26 is illustrated on the front face of the sheet 12, however, the bottom surface 28 is also printable and either or both of the surfaces 26,28 could be printed. The illustrated sheet 12 is preferably formed from a non-magnetic material, such as paper. The illustrated printable sheet 12 is a generally rectangular sheet, such as sheeted to an eight-and-one-half inch width from printable paper stock. However, the printable sheet 12 could be formed of virtually any printable material (e.g., synthetic resin, composite materials, metals, foil, combinations thereof, etc.) and could include a printable layer backed by a substrate. The printable sheet 12 is illustrated printed, however, the sheet 12 need not be printed.

As shown in FIG. 3, the magnetic sheet 14 includes a top printable layer 30, an intermediate adhesive layer 32, and a bottom magnetic layer 34. The layers 30,32,34 are joined in registry to present a rectangular sheet 14 with a complemental width dimension to correspond to the sheet 12. In this manner, when the sheets 12,14 are joined, the continuous printable surface 24 defined thereby, presents a generally uniform rectangular shape adapted to be printed in most conventional print systems. In more detail, the top printable layer 30 includes a front face 30a and an opposite rear face 30b. The front face 30a comprises the lower portion of the printable surface 24. The illustrated printable layer 30 is formed of vinyl. However, the printable layer could be formed of any printable material (e.g., paper, synthetic resin, other printable stock, etc.). The rear face 30b of the printable layer 30 is adhered to the magnetic layer by the intermediate adhesive layer 32. The adhesive layer 32 preferably permanently bonds the printable layer 30 to the magnetic layer 34 in registry. The adhesive layer 32 could be any conventional adhesive that provides sufficient adherence between the layers 30,34, such as a pressure sensitive adhesive. However, the adhesive could be any suitable adhesive known in the art, including repositionable adhesives. The bottom magnetic layer 34 includes a front face 34a and an opposite rear face 34b. The front face 34a is adhered to the printable layer 30 by the adhesive layer 32. As described in detail below, the rear face 34b receives an applied coating carrier. The magnetic layer 34 is preferably formed of a flexible magnetic material having a relatively thin configuration yet still providing sufficient magnetic flux to adhere to most ferromagnetic surfaces. For example, the magnetic layer 34 could be formed of a ferrite powder bonded with rubber in one manner well known in the art. Although the sheet 14 is preferably magnetic, it is within the ambit of the present invention to utilize virtually any substrate to support one or both sections of the printable surface 24, and the principles of the present invention are not limited to joining two substrates into a continuous sheet, but could also include joining more than two substrates.

Turning to FIGS. 2 and 3, the illustrated sheets 12, 14 are joined in an edge-to-edge relationship to form the seam 16 and married together with the tape 18 to present the printable surface 24. In more detail, the top printable surface 26 of the sheet 12 and the front face 30a of the top layer 30 of the sheet 14 are aligned in the same plane to present the continuous printable surface 24. That is to say, the sheets 12,14 do not overlap one another. In this regard, the sheets 12,14 must be aligned with sufficient precision to provide a relatively tight seam 16 without providing any overlap between the sheets 12,14. The gap between the edges of the sheets 12,14 at the seam 16 is preferably less than one-sixty-fourths inch and most preferably about one-one-hundredths inch or less. In this manner, the resulting business form product 10 presents a streamline configuration having a smooth printable surface 24 and without a bulging seam, even when using a relatively thick substrate such as the sheet 14. This streamline configuration enables the business form product 10 to be stacked up with other like forms and individually and sequentially fed through a desktop printer.

Figure 5:
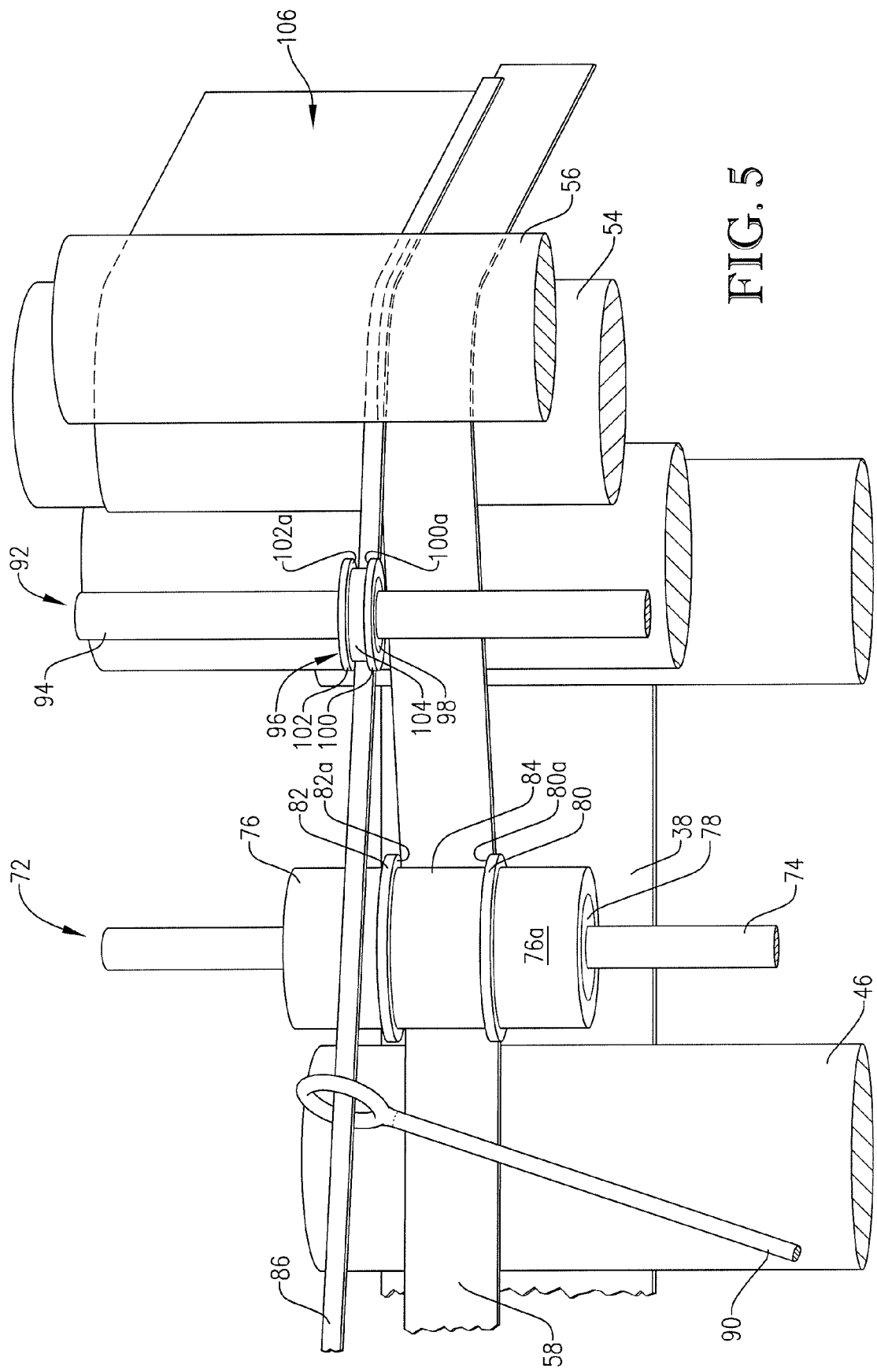
FIG. 5 is a bottom perspective view of the press illustrated in FIG. 4 and showing the mechanical tape guides and the mechanical web guide feeding the corresponding streamer of tape and web into the nip roller.

Turning to FIGS. 4 and 5, the illustrated sheets 12,14 are joined in a web-type inline rotary press 36, as is commonly used in various printing technologies including, but not limited to, flexographic or rotogravure printing applications, that has been modified with the inventive modifications of the present invention. In more detail, the sheet 12 starts out as an upper continuous web 38 wound onto a roll 38a. The roll 38a is unwound at a first unwinding station 40 including a plurality of idler rollers 42, 44, 46, 48 and 50. The unwinding station further includes a web guide 52. In one manner well known in the art, the web guide 52 is an optic-type web guide that senses the alignment of the web 38 and communicates with the adjustable idler rollers 46,48 to control adjustment of the rollers 46,48 (e.g., pivots the rollers about a vertical axis) to effect the desired alignment. The web guide 52 preferably aligns the web 38 within a tolerance of one-thirty-seconds inch. One suitable web guide is available as a special order (e.g., configured for the specific thickness and the width of the web 38) from Coast Controls Inc. of Sarasota, Fla. The web 38 is fed from the unwinding station 40 into a pair of nip rollers 54 and 56 where it is married with the sheet 14 as detailed below. The web 38 generally travels along a longitudinal path traveling left-to-right as viewed in FIG. 4 through the nip rollers 54,56, although the web 38 moves vertically at times as it weaves through the idler rollers 44,50.

The sheet 14 starts out as a lower continuous substrate web 58 wound onto a roll 58a. The roll 58a is unwound at a second unwinding station 60 including a plurality of idler rollers 62, 64, 66 and 68. The second unwinding station 60 further includes a web guide 70 similar to the previously described web guide 52 and configured for aligning the magnetic substrate 58. The web 58 is fed from the second unwinding station 60 into the nip rollers 54,56 where it is joined with the web 38 as detailed below. Once the web 58 enters the nip rollers 54,56, the webs 38,58 travel along the same path. Prior to entering the nip rollers 54,56, the web 58 is positioned vertically below the web 38, but also generally travels along a longitudinal path traveling left-to-right as viewed in FIG. 4. However, the webs 38,58 could be variously positioned prior to entering the nip rollers 54,56 (e.g., side-by-side, etc.). It is important, however, that the webs 38,58 be sufficiently aligned when they enter the nip rollers 54,56 as detailed below.

In this regard, in addition to the alignment provided by the web guide 70, the web 58 is further aligned by a mechanical web guide 72 prior to entering the nip rollers 54,56. In more detail, and as shown in FIG. 5, the mechanical web guide 72 includes a shaft 74 fixed to the press 36 and a roller 76 rotatably supported on the shaft 74. In this regard, the roller 76 is journaled to the shaft 74 by bearings 78 press fit between the shaft 74 and the roller 76. The illustrated roller 76 is a four inch outer diameter roller and one suitable bearing is available as Part No. ER16K-MHFF from MB Manufacturing Incorporated of Valparaiso, Ind. The roller 76 is preferably formed of a machined metal, such as aluminum, and defines a generally cylindrical shape presenting a smooth outer circumferential surface 76a. The illustrated roller 76 includes a pair of spaced apart collars 80 and 82, each being adjustably fixed to the surface 76a and projecting radially therefrom. For example, the collars 80,82 could be fixed to the surface 76a with set screws (not shown), such as brass-tipped, plastic-tipped, etc. The collars 80,82 are spaced apart to define a sleeve section 84 therebetween for receiving the web 58. Each of the collars 80,82 presents an inside flange 80a and 82a, respectively, that engages the sleeve section 84 and projects radially therefrom to guide, and thereby align, the web 58 when the web 58 engages the flange 80a,82a.

The illustrated flanges 80a,82a extend sufficiently from the surface 76a to guide the web 58 without allowing the web 58 to work over the flange 80a,82a and without interfering with other equipment on the press 36. In this regard, the web 58 includes a magnetic substrate and accordingly the flanges 80a,82a preferably extend about three-eighths inch from the surface 76a. However, in addition to the thickness of the web that is carried, the height of the flanges 80a,82a is also dependent on the spacing of the guide 72 from the closest, preceding upstream idler roller. That is to say, the closer the preceding roller is to the guide 72, the more resistant the web 58 is to being guided and thus the web 58 is more likely to work its way over the flange 80a,82a or become undesirably deformed on its edges. In addition, the closer the guide 72 gets to the nip rollers 54,56, the more precise the alignment provided thereby becomes. In this regard, the guide 72 is preferably at least four feet of lineal web length from the idler roller 68, more preferably at least ten feet of web length from the roller 68, and most preferably about fifteen feet from the roller 68. In addition, the guide 72 is preferably within one foot of lineal web length from the nip roller 54 and most preferably within nine inches of the nip roller 54.

The web 58 is unwound from the roll 58a and fed through the idler rollers 62,64,66,68 where it is initially aligned by the web guide 70. After exiting the web guide 70, the web 58 extends along the path and engages the sleeve section 84 of the roller 76 prior to entering the nip rollers 54,56. The illustrated roller 76 is a freely rotating roller, therefore, when the web 58 engages the sleeve section 84, this engagement causes the roller 76 to rotate at the rate of feed of the web 58. The collars 80,82 are preferably positioned so that in optimal alignment conditions, the web 58 does not engage either of the flanges 80a,82a and enters the nip rollers 54,56 exactly engaging, but not overlapping, the web 38. That is to say, at optimum alignment, there would be virtually no gap between the webs 38,58 at the seam 16. However, given the tendencies of the optic-type guide 70 to loop the web 58, optimum alignment will not always be achieved. When not in optimum alignment, the web 58 will engage either the flange 80a or the flange 82a. When the web 58 engages one of the flanges 80a,82a, the web 58 is caused to move back into the sleeve section 84, i.e., back into optimum alignment. As the web 58 adjusts, there will be slight tolerances associated with the adjustment. With the most preferred configuration described above, the mechanical web guide 72 can enable alignment of the web 58 within one-one-hundredths inch of the web 38.

The illustrated mechanical web guide 72 enables the webs 58,38 to be precisely aligned in the edge-to-edge relationship. In addition, the roller 76 presents smooth rotating surfaces that engage the web 58 thus reducing the risk of undesired damage to the web 58 resulting from friction between the web 58 and the roller 76. This is particularly so in the illustrated roller 76 wherein the entire roller 76 rotates at the rate of feed of the web 58. However, it is within the ambit of the present invention to utilize various alternative configurations for the mechanical web guide 72. For example, the mechanical web guide could utilize a single collar and flange, particularly when used to align substrates such as paper where only one good edge may be presented. Additionally, the collar or collars could be stationary with only the sleeve section rotatable. Alternatively, the entire guide could be forcibly driven to rotate at the rate of feed of the corresponding web. However, it is important that at least a portion of the web guide engage the web and be rotatable (e.g., the sleeve, the collar, or the entire roller, etc.). It is within the ambit of the present invention to utilize one or more mechanical web guides to align one or more of the webs, however, it is important that whatever mechanical web guides are utilized be positioned to facilitate alignment and reduce the risk of undesired damage to the web or webs.

Once the webs 38,58 are aligned, they are joined together by applying the heat-resistant tape 18 over the seam 16. In more detail, the tape 18 starts out as a continuous streamer of tape 86 wound around a spool 86a. The streamer 86 is unwound, aligned over the seam 16, and applied along the seam 16 at a tape-applying station 88. The tape-applying station 88 includes the previously described nip rollers 54,56, a first tape guide 90, and a second tape guide 92. The first tape guide 90 is a rough guide to facilitate unspooling the streamer 86. The illustrated guide 90 is a simple eye-bolt fixed relative to the press 36. The second tape guide 92 is a mechanical tape guide for aligning the streamer 86 over the seam 16. Particularly, the guide 92 includes a shaft 94 fixed relative to the press 36 and a roller 96 rotatably supported on the shaft 94. The guide 92 is sized and dimensioned differently than the previously described guide 72, but is similar thereto in many respects. The roller 96 is journaled to the shaft 94 by bearings 98 press fit between the shaft 94 and the roller 96. The illustrated roller 96 is a one and one-quarter inch outer diameter roller and one suitable bearing is available as Part No. 6001-2Z from SKF of Kulpsville, Pa. The roller 96 is preferably formed of a machined metal, such as aluminum, and defines a generally cylindrical shape presenting a smooth outer circumferential surface 96a. The illustrated roller 96 includes a pair of spaced apart collars 100 and 102, each being adjustably fixed to the surface 96a and projecting radially therefrom. For example, the collars 100,102 could be fixed to the surface 96a with set screws (not shown), such as brass-tipped, plastic-tipped, etc. The collars 100,102 are spaced apart to define a sleeve section 104 therebetween sized and dimensioned for receiving the streamer 86. Each of the collars 100,102 presents an inside flange 100a and 102a, respectively, that engages the sleeve section 104 and projects radially therefrom to guide, and thereby align, the streamer 86 when the streamer 86 engages the flange 100a, 102a.

As shown in FIG. 5, the mechanical tape guide 92 aligns the streamer of tape 86 over the seam 16 prior to the streamer 86 entering the nip rollers 54,56. Once the streamer 86 enters the nip rollers 54,56, the streamer 86 is applied to the webs 38,58 over and along the seam 16 to thereby marry the webs 38,58 into a single continuous sheet 106. The seam 16 extends along and is generally parallel to the longitudinal path of the press 36. Similar to the web guide 72 discussed above, the illustrated tape guides 90,92 are configured and positioned to provide optimum alignment of the streamer 86 over the seam 16 without undesirably deforming the streamer 86 or interfering with any other press equipment. In this regard, the mechanical tape guide 92 preferably has a flange height of at least three-thirty-seconds inch and most preferably between one-eighth and three-sixteenths inch. The guide 92 is preferably within one foot of lineal streamer length of the nip roller 54 and most preferably within three inches thereof. The rough guide 90 is preferably at least about two feet from the spool 86a and preferably between six and nine inches from the guide 92. However, just as discussed above with respect to the guide 72, the guide 92 could be alternatively configured and positioned.

As shown in FIG. 4, the single continuous sheet 106 is fed over an idler roller 108 and wound into a roll 106a. The roll 106a of the continuous sheet 106 is a business form product as that phrase is used herein, whether the sheet 106 has been printed or not. Although not shown in FIG. 4, once the tape 86 has been applied, the continuous sheet 106 can be fed into other downstream stations, such as a station for applying a coating carrier 108. The use of the coating carrier 108 is preferred with the magnetic substrate, particularly if the magnetic substrate is die cut. The coating carrier 108 is applied to the rear face 34b of the magnetic layer 34 of the sheet 14, i.e. to the rear face of the web 58. The coating carrier 108 retains the magnetic sheet 14 together after the sheet 14 has been die cut and enables the sheet 14 to be easily and quickly removed from a stack of other similar magnetic sheets (e.g., for sequential feeding into an offline print system, etc.) without inhibiting the desired magnetic properties of the finished business form product 10. One suitable coating carrier is disclosed in the '735 application previously incorporated herein by reference. As described in the '735 application, the press 36 could be readily modified by those skilled in the art to apply the coating carrier 108.

As previously indicated, the coating carrier 108 retains the magnetic sheet 14 and/or the web 58 together after the sheet 14 or web 58 has been die cut, yet allows the die cut portion to be quickly and easily removed from the sheet 14. In the illustrated business form product 10, a pair of cards 110 and 112 are formed in the magnetic sheet 14 by a plurality of die cuts 114 formed in the magnetic sheet 14 (see FIGS. 1 and 3). Similar cards are described in detail in the '735 application previously incorporated herein. The plurality of die cuts 114 can be made at a downstream station in the press 36 (not shown) once the continuous sheet 106 has been formed, or can be done in a separate press after the sheet 106 has been rolled in the roll 106a.

Figure 7:
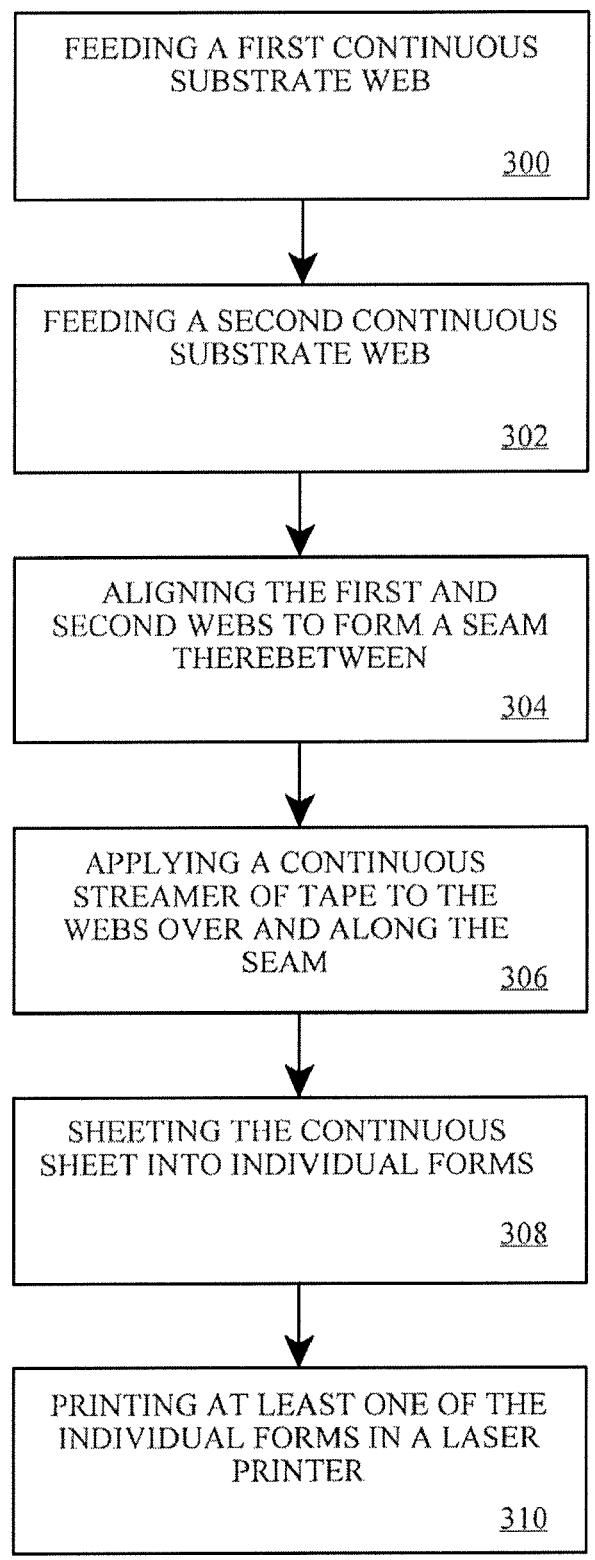
FIG. 7 is a flow diagram depicting a method of forming a business form in accordance with a preferred embodiment of the present invention.

In order to convert the continuous sheet 106 into the illustrated business form product 10, the sheet 106 is simply sheeted to the desired length and printed. The sheeting can be done in the press 36, such as in an exit station (not shown) where the sheet 106 is sheeted to the desired length and die cut to form the die cuts 114. Alternatively, the sheet 106 can be rolled into the roll 106a and transferred to another press where the sheeting is done. The individual business form products can then be stacked and taken offline to a separate print station (e.g., a desktop laser or ink jet printer) to form the finished business form product 10. However, the continuous sheet 106 could also be printed inline in the press 36 at one or more print stations (not shown) in any manner known in the art. As shown in FIG. 7, in the preferred embodiment of sheeting and printing the products to provide a finished business form product 10, the method involves the steps of feeding a first continuous substrate web 300, feeding a second continuous substrate web 302, aligning the first and second webs to form a seam therebetween 304, applying a continuous streamer of tape to the webs over and along the seam 306, sheeting the continuous sheet into individual forms 308, and printing at least one of the individual forms in a laser printer 310.

As indicated above, when the sheets 12,14 are joined, the continuous printable surface 24 defined thereby, presents a generally uniform rectangular shape adapted to be printed in most conventional print stations. For example, the illustrated printable surface 24 presented by the business form product 10 preferably has conventional eight-and-one-half by eleven inch margins to enable the product 10 to be printed in conventional desktop print systems such as laser or ink jet printers. However, it is within the ambit of the present invention to configure and dimension the business form product 10 for virtually any printing application, including, but not limited to, larger production run print systems such as web-type, flexographic printing applications wherein product dimensions are virtually unlimited.

As previously indicated, the tape 18, and thus the streamer of tape 86, is heat-resistant tape. In this regard, the tape 18 can be fed through a high heat print station, such as a laser printer, and maintain the joinder of the seam 16 without degrading or fracturing the seam 16. The term heat-resistant tape, as that term is used herein, refers to a tape that maintains its adhesive integrity when exposed to temperatures as high as one-hundred, seventy-five degrees Fahrenheit. Referring back to FIGS. 2 and 3, the illustrated tape 18 includes a backing layer 116 and an adhesive layer 118. The illustrated backing layer 116 is formed from polyester. In this regard, it is important that the backing layer 116 be at least primarily formed from polyester in order to provide the desired heat-resistant qualities and in order to enable a streamline profile for the tape seam 18. That is to say, a primarily paper backing, even if thick enough to provide the necessary strength, is not preferred because of its relative thickness. The illustrated adhesive 118 is a solvent rubber resin adhesive. One suitable tape is available as Model No. 18-RM from International Tape Company of Windham, N.H. However, various alternative adhesives could be utilized. For example, the adhesive could be a UV cured pressure-sensitive adhesive or an acrylic adhesive. However, it is important that the tape be heat-resistant as that term is used herein and provide for a relatively low-profile, streamlined tape seam. In this manner, the business form product 10 can be printed in high heat print applications, such as a laser printer.

As previously indicated, the multiple webs, or substrates, joined by the method of the present invention are not limited to any particular type of substrate or relative thickness, so long as the multiple webs are joined in an edge-to-edge relationship. One such suitable alternative embodiment is the business form product 200 illustrated in FIG. 6. The business form product 200, similar to the previously described business form product 10, is formed by joining multiple substrates 202 and 204 in an edge-to-edge relationship to form a seam 206 therebetween and marrying the substrates 202,204 by applying a heat-resistant tape 208 over and along the seam 206. The illustrated substrate 202 is formed from paper and the illustrated substrate 204 is formed from plastic. However, the substrates could be formed from virtually any material suitable for printing applications. The business form product 200 is shown in section and thus could be either a continuous sheet, similar to the continuous sheet 106 detailed above formed in the press 36, or an individual form sheeted from the continuous sheet.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventor hereby states his intent to rely on the Doctrine of Equivalents to deter-mine and assess the reasonably fair scope of the present invention as pertains to any apparatus not materially departing from but outside the literal scope of the invention as set forth in the following claims.

What is claimed is:
1. A method of forming a business form product of multiple substrates, said method comprising the steps of:
(a) feeding a first continuous substrate web along a longitudinal path;
(b) feeding a second continuous substrate web along the path;
(c) aligning the first and second webs in a non-overlapping edge-to-edge relationship to form a seam therebetween, wherein the seam extends along and is at least generally parallel to the path, with any spacing between the webs along the seam being from zero to less than one-sixty-fourths of an inch; and (d) applying a continuous streamer of heat resistant tape to the webs over and along the seam to retain the webs in said edge-to-edge relationship to thereby form a common continuous sheet, said substrate webs and said tape all converging at a common joining location.

2. The method as claimed in claim 1,
one of said webs being at least in part formed from magnetic material.

3. The method as claimed in claim 1,
step (c) including the step of placing the first and second webs in contact with each other along at least part of the seam.

4. The method as claimed in claim 1,
said longitudinal path being defined in a rotary press; and
(e) feeding said continuous sheet through the press.

5. The method as claimed in claim 1; and
(e) rolling the continuous sheet into a roll to thereby form the business form product.

6. The method as claimed in claim 1; and
(e) sheeting the continuous sheet into individual forms to thereby form the business form product.

7. The method as claimed in claim 6; and
(f) printing at least one of said individual forms in a laser printer without fracturing the seam.

8. The method as claimed in claim 1; and
(e) feeding at least a portion of said continuous sheet through a laser printer including a heat source between the ranges of one-hundred and one-hundred and seventy-five degrees Fahrenheit,
said heat-resistant tape being operable to substantially retain the webs in said edge-to-edge relationship after being exposed to said heat source.

9. The method as claimed in claim 1,
said streamer of tape including a backing layer and an adhesive.

10. The method as claimed in claim 9,
said backing layer being formed from polyester.

11. The method as claimed in claim 10,
said adhesive being an ultraviolet-cured pressure sensitive adhesive.

12. The method as claimed in claim 10,
said adhesive being formed from acrylic.

13. The method as claimed in claim 10,
said adhesive being formed from rubber.

14. The method as claimed in claim 1,
said longitudinal path being defined in a rotary press,
step (d) including the step of feeding the aligned webs and the streamer of tape through a nip roller to apply the tape over and along the seam.

15. The method as claimed in claim 14,
step (c) including the steps of aligning at least one of the webs with a mechanical guide prior to feeding the at least one web through the nip roller.

16. The method as claimed in claim 15,
said mechanical guide including a shaft and at least one collar that engages one edge of the at least one web to thereby align said at least one web in said edge-to-edge relationship with the other web,
said at least one web being within at least about one-one-hundredths of an inch from said other web when in said edge-to-edge relationship.

17. The method as claimed in claim 16,
said mechanical guide being positioned upstream of the nip roller and located within one foot of web length from the nip roller.

18. The method as claimed in claim 17,
said at least one web being at least in part formed from magnetic material,
step (c) further including the step of feeding the at least one web through an idler roller prior to feeding the at least one web through said mechanical guide,
said idler roller being positioned at least four feet of web length from the mechanical guide.

19. The method as claimed in claim 14,
step (d) further including the step of feeding the streamer of tape through at least one mechanical guide prior to feeding the tape through the nip roller.

20. The method as claimed in claim 19,
said at least one mechanical guide including a stationary shaft and a collar rotatably supported on the shaft,
said collar operable to engage both opposed edges of the streamer of tape to align the streamer of tape over the seam.

21. The method as claimed in claim 20,
said at least one mechanical guide being positioned about three inches of streamer length from the nip roller.

22. The method as claimed in claim 20,
step (d) further including the step of feeding the streamer of tape through an additional mechanical guide prior to feeding the tape through said first-mentioned mechanical guide,
said additional mechanical guide including an eyelet that the streamer of tape passes through.

23. The method as claimed in claim 22,
said additional mechanical guide being positioned between six and nine inches of streamer length from said first-mentioned mechanical guide,
said additional mechanical guide being at least about two feet of streamer length from any other upstream roller.

24. A printable business form product that comprises multiple substrates and is formed by a process comprising the steps of:

(a) feeding a first continuous substrate web along a longitudinal path;

(b) feeding a second continuous substrate web along the path;

(c) aligning the first and second webs in a non-overlapping edge-to-edge relationship to form a seam therebetween, wherein the seam extends along and is at least generally parallel to the path, with any spacing between the webs along the seam being from zero to less than one-sixty-fourths of an inch; and (d) applying a continuous streamer of heat resistant tape to the webs over and along the seam to retain the webs in said edge-to-edge relationship to thereby form a common continuous sheet, said substrate webs and said tape all converging at a common joining location.

25. The business form product as claimed in claim 24,
one of said webs being at least in part formed from magnetic material.

26. The business form product as claimed in claim 24,
step (c) including the step of placing the first and second webs in contact with each other along at least part of the seam.

27. The business form product as claimed in claim 24,
said longitudinal path being defined in a rotary press; and
(e) feeding said continuous sheet through the press.

28. The business form product as claimed in claim 24; and
(e) rolling the continuous sheet into a roll to thereby form the business form product.

29. The business form product as claimed in claim 24; and
(e) sheeting the continuous sheet into individual forms to thereby form the business form product.

30. The business form product as claimed in claim 29; and
(f) printing at least one of said individual forms in a laser printer without fracturing the seam.

31. The business form product as claimed in claim 24; and
(e) feeding at least a portion of said continuous sheet through a laser printer including a heat source between the ranges of one-hundred and one-hundred and seventy-five degrees Fahrenheit,
said heat-resistant tape being operable to substantially retain the webs in said edge-to-edge relationship after being exposed to said heat source.

32. The business form product as claimed in claim 24,
said streamer of tape including a backing layer and an adhesive.

33. The business form product as claimed in claim 32,
said backing layer being formed from polyester.

34. The business form product as claimed in claim 33,
said adhesive being an ultraviolet-cured pressure sensitive adhesive.

35. The business form product as claimed in claim 33,
said adhesive being formed from acrylic.

36. The business form product as claimed in claim 33,
said adhesive being formed from rubber.

37. The business form product as claimed in claim 24,
said longitudinal path being defined in a rotary press,
step (d) including the step of feeding the aligned webs and the streamer of tape through a nip roller to apply the tape over and along the seam.

38. The business form product as claimed in claim 37,
step (c) including the steps of aligning at least one of the webs with a mechanical guide prior to feeding the at least one web through the nip roller.

39. The business form product as claimed in claim 38,
said mechanical guide including a shaft and at least one collar that engages one edge of the at least one web to thereby align said at least one web in said edge-to-edge relationship with the other web,
said at least one web being within at least about one-one-hundredths of an inch from said other web when in said edge-to-edge relationship.

40. The business form product as claimed in claim 39,
said mechanical guide being positioned upstream of the nip roller and located within one foot of web length from the nip roller.

41. The business form product as claimed in claim 40,
said at least one web being at least in part formed from magnetic material,
step (c) further including the step of feeding the at least one web through an idler roller prior to feeding the at least one web through said mechanical guide,
said idler roller being positioned at least four feet of web length from the mechanical guide.

42. The business form product as claimed in claim 37,
step (d) further including the step of feeding the streamer of tape through at least one mechanical guide prior to feeding the tape through the nip roller.

43. The business form product as claimed in claim 42,
said at least one mechanical guide including a stationary shaft and a collar rotatably supported on the shaft,
said collar operable to engage both opposed edges of the streamer of tape to align the streamer of tape over the seam.

44. The business form product as claimed in claim 43,
said at least one mechanical guide being positioned about three inches of streamer length from the nip roller.

45. The business form product as claimed in claim 43,
step (d) further including the step of feeding the streamer of tape through an additional mechanical guide prior to feeding the tape through said first-mentioned mechanical guide,
said additional mechanical guide including an eyelet that the streamer of tape passes through.

46. The business form product as claimed in claim 45,
said additional mechanical guide being positioned between six and nine inches of streamer length from said first-mentioned mechanical guide,
said additional mechanical guide being at least about two feet of streamer length from any other upstream roller.

* * * * *